(12) United States Patent
Okayama

(10) Patent No.: US 6,496,614 B1
(45) Date of Patent: Dec. 17, 2002

(54) LIGHT MULTIPLEXING WAVE DIVISION DEVICE

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 99 days.

(21) Appl. No.: 09/699,418

(22) Filed: Oct. 31, 2000

(30) Foreign Application Priority Data

Jul. 26, 2000 (JP) .................................. 2000-225690

(51) Int. Cl.$^7$ ................................................ G02B 6/28
(52) U.S. Cl. .................................... 385/24; 385/129
(58) Field of Search ......................... 385/24, 37, 129, 385/130

(56) References Cited

U.S. PATENT DOCUMENTS

| | | | |
|---|---|---|---|
| 4,800,557 A | * | 1/1989 | Weber .......................... 359/130 |
| 4,938,553 A | * | 7/1990 | Maerz et al. ................ 359/569 |
| 5,061,032 A | | 10/1991 | Meltz et al. |
| 6,014,482 A | * | 1/2000 | Laude .......................... 385/24 |
| 6,016,375 A | * | 1/2000 | Hill et al. ................... 385/129 |
| 6,049,640 A | | 4/2000 | Doerr |

OTHER PUBLICATIONS

Madsen, C.K., entitled "Planar Waveguide Grating Optical Spectrum Analyzer", Integrated Photonics Research, IMG4 1998, pp. 99–101.

* cited by examiner

Primary Examiner—Ellen E. Kim
(74) Attorney, Agent, or Firm—Wenderoth, Lind & Ponack, L.L.P.

(57) ABSTRACT

A curved waveguide and a linear waveguide are formed in a planar waveguide, and the curved waveguide has a discontinuous structure broken by the planar waveguide. A light signal input to the curved waveguide is reflected at a discontinuous surface of the curved waveguide thereof, and each light is wave-divided and focused on a linear waveguide. Furthermore, each light signal having each wavelength input to the linear waveguide is wave-divided and focused on the discontinuous portion of the curved waveguide.

11 Claims, 5 Drawing Sheets

LIGHT MULTIPLEXING WAVE DIVISION DEVICE

BACKGROUND OF THE INVENTION

1. Field of the Invention

The present invention relates to an optical waveguide device for wave-dividing and outputting each input light signal having each wavelength that is wavelength-multiplexed and wave-multiplexing each light signal having each wavelength. In particular, the present invention relates to a multiplexing wave division device having the waveguide formed in a planar waveguide.

2. Description of Related Art

In the field of optical communication, a wavelength division multiplexing (WDM: Wavelength Division Multiplexing) system, which encodes a plurality of signals as respective separate division lights and transmits by way of an optical fiber, has been developed. In this system, it is required to divide or multiplex lights having different respective wavelengths so as to input and output. Conventionally, various types of devices such as array waveguide grating devices, devices utilizing gratings, and so forth have been acknowledged as such optical wave division devices. Examples of optical wave division devices utilizing the gratings are shown in FIGS. 1 and 2.

In the device shown in FIG. 1, a linear waveguide 2 is provided on a substrate 1, and a linear chirp grating 3 is formed thereon. A planar waveguide 4 is formed parallel with the linear waveguide 2, and one or more output waveguides 5 are formed and connected to the boundary face thereof. The light input from a part of the linear waveguide 2 is reflected onto the grating 3, and input to a planar waveguide 4 through the linear waveguide 2.

The closer to the top position the grating 3 is, the smaller the period thereof becomes. Accordingly, the light transmits so as to be focused onto the boundary portion of the planar waveguide 4 as shown in the figure[*1]. Each focusing point having each wavelength is different from the other corresponding to the interference condition of the light depending on the wavelength on this boundary, and it becomes possible to select each light having each wavelength if the output waveguide 5 is provided in the boundary. Furthermore, as shown in FIG. 2, another method, in which such a special grating as used in the structure of FIG. 1, has been proposed.

In the structure of FIG. 2, the grating, formed at even intervals, is provided in a curved waveguide 13 arranged in the shape of an arc, and not in a linear waveguide. Furthermore, a planar waveguide 14 is provided along the curved waveguide 13, and one or more output waveguides 15 are provided in a central position of the arc of the curved waveguide 13[*2]. The grating is tilted to the center of the waveguide in order for the light reflected onto the grating to gather at the center of the arc thereof According to the structure of FIG. 2, it is possible to condense the light to a point even if the grating is formed at even intervals.

SUMMARY OF THE INVENTION

It is a primary object of the present invention to replace a conventional grating with a reflecting surface capable of being manufactured through a waveguide manufacturing process. The present invention includes an output waveguide and a curved waveguide for an input in a planar waveguide, whereby the curved waveguide for the input forms a discontinuous structure. In addition, optical signals are wavelength-divided by way of reflection by the discontinuous surface thereof and each optical signal having each wavelength is focused in an output waveguide. Accordingly, it is possible to form the structure having the best suitable waveguide shape and the reflecting surface, and thus a qualified controllable device is capable of being formed.

BRIEF DESCRIPTION OF THE DRAWINGS

While the specification concludes with claims that particularly point out and distinctly claim the subject matter which is regarded as the invention, it is believed that the invention, the object, features and advantages thereof will be better understood from the following description used in connection with the accompanying drawings in which:

DETAILED DESCRIPTION OF THE INVENTION

While particular embodiments of the present invention are described and illustrated, it should be understood that the invention is not limited thereto since modifications may be made by persons skilled in the art. The present application contemplates any and all modifications that fall within the spirit and scope of the underlying invention described and claimed herein.

The present invention is to replace conventional grating with a reflecting surface capable of being manufactured through a waveguide manufacturing process. The present invention includes an output waveguide and a curved waveguide for input in a planar waveguide, whereby the curved waveguide for the input forms a discontinuous structure. In addition, optical signals are wavelength-divided by way of reflection by the discontinuous surface thereof and each optical signal having each wavelength is focused in an output waveguide. Accordingly, it is possible to form the structure having the best suitable waveguide shape and reflecting surface, and thus a qualified controllable device is capable of being formed.

Figure 3:
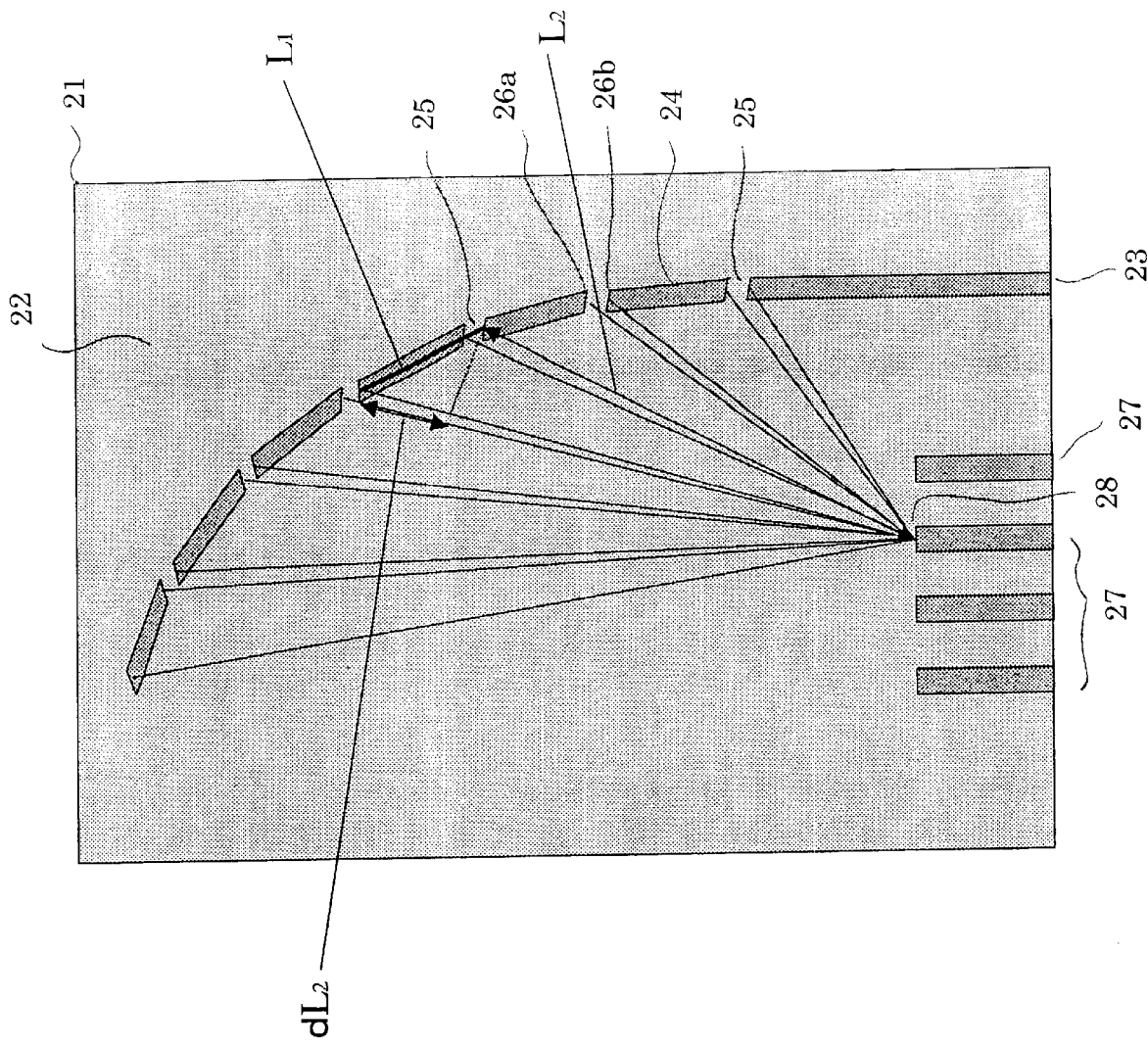
FIG. 3 is a top plane view of a light wave division device of the first preferred embodiment of the present invention.

FIG. 3 illustrates an optical wave division device for explaining the first preferred embodiment of the present invention. A planar optical waveguide 22 is formed on a substrate 21, and an optical waveguide 24 and an input port 23 of an optical waveguide having a high effective refractive index are further formed on the planar optical waveguide 22. Furthermore, the input port 23 and the optical waveguide 24 are separated by way of a part (a discontinuous part of the optical waveguide) 25 of the planar optical waveguide 22, and thus the optical waveguides 23 and 24 are formed in a discontinuous manner.

The optical waveguides 23 and 24 are structured so as to confine and transmit a light because they have a higher effective refractive index than a portion of the planar optical waveguide 22, and furthermore, a light which is transmitted through the optical waveguides 23 and 24 is reflected and refracted at respective boundaries 26a and 26b since the discontinuous part 25 has the same effective refractive index as the planar optical waveguide 22. The planar optical waveguide 22 is structured in such a way that output ports 27 of the optical waveguides are formed and a light reflected at the discontinuous part 25 is focused onto a focal point 28 and guided to the output ports 27 of the optical waveguide.

There are various methods for manufacturing the waveguide parts 23 and 24 having high effective refractive indexes in the planar waveguide 21, such as a method of embedding using a high refractive substance, a method of forming a different kind of material on the planar waveguide, forming a portion having a thick layer of the waveguide in the planar waveguide, and a method of causing a refractive index difference by UV-irradiating a portion except the planar optical waveguide 22.

In such a case that a phase difference between lights from respective reflective surfaces 25 is a constant at the center 28, in the conventional array waveguide circuit grating device, each light having each wavelength is focused in the vicinity of the focal point 28 in the same way that each light having each wavelength radiated from the array waveguide toward the planar waveguide is focused on each of a plurality of terminals of the planar waveguide.

Figure 4:
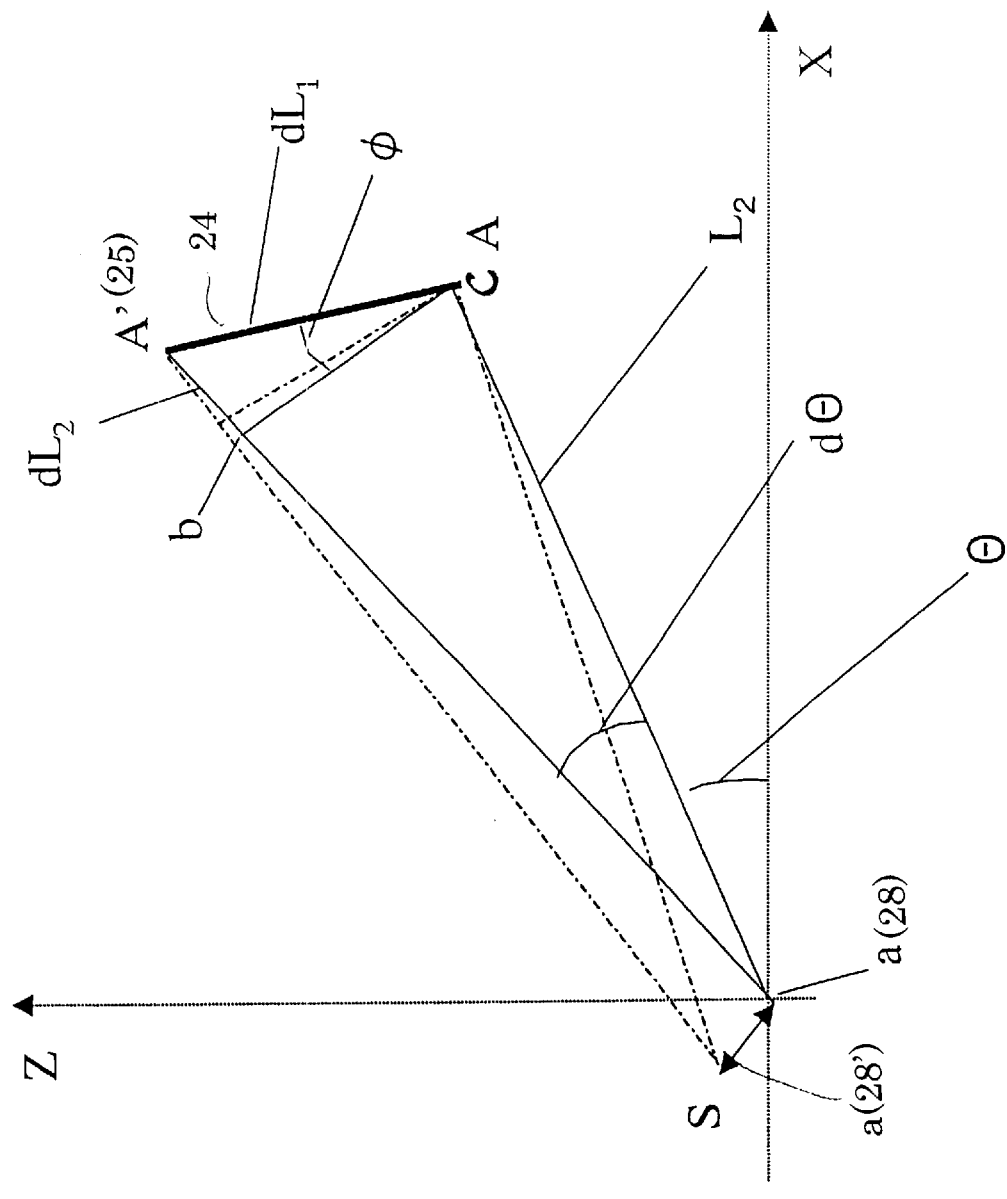
FIG. 4 is an enlarged view of a light wave division device of the first preferred embodiment of the present invention.

Next, FIG. 4 illustrates an enlarged view of a portion of the optical waveguide 24. The optical waveguide 24 is divided into minute sections each of which has the length $dL_1$. The reflecting surfaces 25 (A and A')[*3] are formed on both sides of the length $dL_1$. The lights from the reflecting surface thereof are focused onto the center of the reflecting surface 25. A triangle aAA' has a side AA' of the optical waveguide 24 having a slope to a side bc of an isosceles triangle abc. The side AA' has a slope $\Phi$ to the side bc.

The next minute section of the optical waveguide 24 is connected to the subsequent minute section of each optical waveguide 24. In the same way, a triangle formed at the minute section thereof and the center 28 has a structure in which the side of the optical waveguide 24 has a slope to the isosceles triangle. It is possible for each slope $\Phi$ of each minute section to be different to the other. Connecting the minute sections in such a way forms an entire curve of the waveguide structure 23. In such a case that the side AA' of the optical waveguide 24 is parallel (identical) with the side bc, namely, $\Phi=0$, the curve of the optical waveguide 24 becomes an arc of a circle.

Here, each vertical angle of the triangles aAA' and abc is defined as $d\Theta$. The angle of side aA of the triangle thereof to a horizontal axis and the length of the side aA are defined as $\Theta$ and $L_2$, respectively. As the coordinate axes, a Z axis and an X axis[*4] are defined in the vertical direction and the horizontal direction, respectively. When the phase difference between respective lights from respective reflecting surfaces 25 is constant, each light having each wavelength is focused in the vicinity of the focal point 28. In FIG. 4, the light having a different wavelength from the wavelength at the focal point 28 is focused to a focal point 28', which is S away from the focal point 28.

Figure 2:
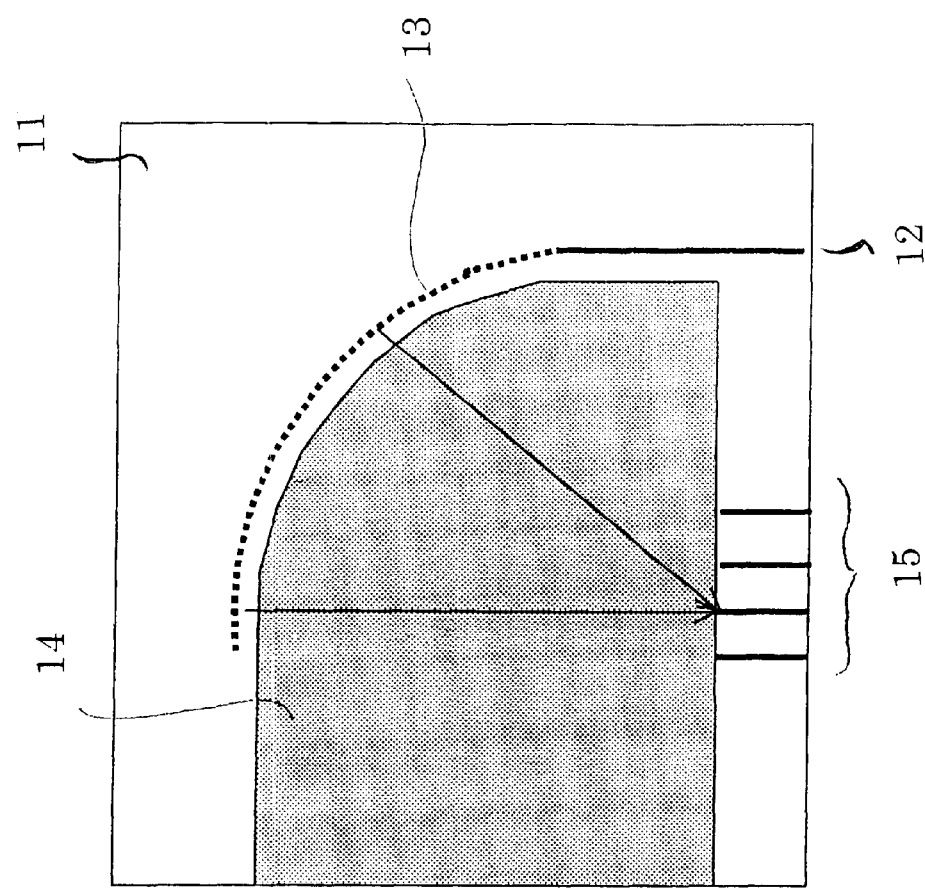
FIG. 2 is a top plane view of a light wave division device having a conventional circular grating structure.
Figure 1:
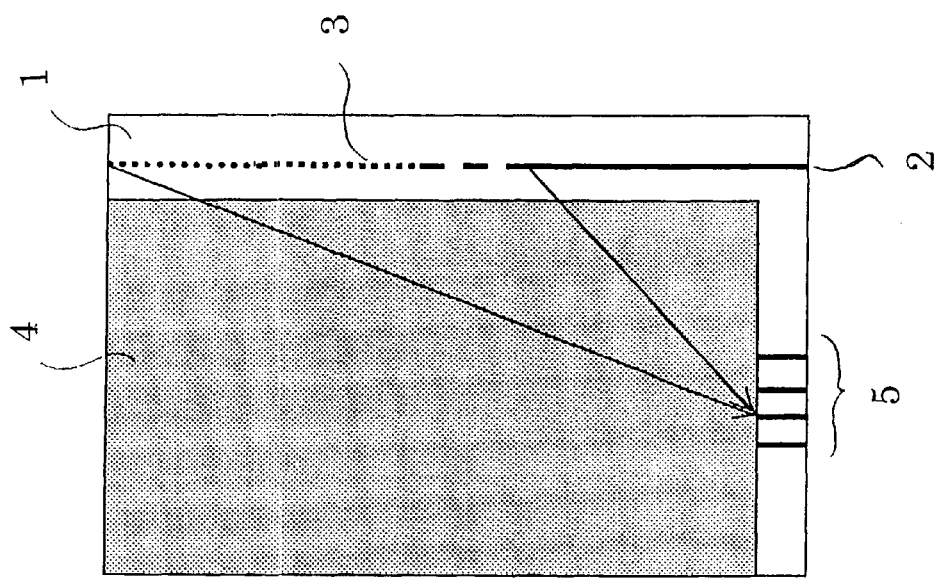
FIG. 1 is a top plane view of a light wave division device having a conventional linear grating structure.

The light from the input port 23[*5] is reflected onto the reflecting surfaces A and A' and focused onto the focal point 28. A phase difference occurs, which is caused by the sum of the phase difference caused by a transmitting distance $dL_1$ and the phase difference caused by the difference $dL_2$ between the transmitting distances caused by the slope of the side AA', for the reflecting light at the reflecting surface A and the reflecting light at the reflecting surface A'. In such a case that the curve of the optical waveguide 24 is the arc of the circle, the difference $dL_2$ of the transmitting distance is not caused, since each of the reflecting surfaces A and A' are located the same distance from the center 28. Here, the phase difference has been caused in the conventional arc structure of FIG. 2.

In such a case that the shape of the structure of the optical waveguide 24 is not an arc, consideration is required to find a way of forming the curve of the optical waveguide 24 and the reflecting surface 25. In such a case that a plurality of output ports are provided, it is required that a phase satisfy the specified condition for each of a plurality of centers 28 having a single structure of the optical waveguide 24. Here, the length $dL_1$ is fixed, thus there is no problem. On the other hand, if the center of the reflecting surface 25 moves, the difference $dL_2$ changes.

It is required that the phase change by the movement of the center of the reflecting surface 25 in respective minute regions of the optical waveguide 24 be a constant or the difference thereof be a constant in respective minute regions. When this condition is not satisfied, a chirp is caused in the phase difference between respective discontinuous parts of the reflecting surface 25. Accordingly, the distribution of the light field is destroyed. This causes an increase of loss and cross-talk.

Next, the shape of the waveguide of FIG. 3 is discussed. Considering the triangle aAA' and the triangle abc, the following equations have been deduced among $dL_1$, $L_2$, $d\Theta$, and $\Phi$.

$$\sin(d\Theta/2)=dL_1 \cos \Phi/(2L_2+dL_2) \tag{1}$$

$$dL_2=dL_1 \sin \Phi/\cos(d\Theta/2) \tag{2}$$

A rough calculation of the equation (2) is made on the assumption that the following equation (3) is constant:

$$dL=dL_1+dL_2 \tag{3}$$

Substituting the equation (3) to the equation (2), the equation (4) is obtained using the equation (1):

$$L_2=(dL/2)[\cos \Phi/\sin(d\Theta/2)-\sin \Phi/\cos(d\Theta/2)]/[1+\sin \Phi/\cos(d\Theta/2)] \tag{4}$$

When dL is extremely short, $dL/2L_2<<1$, the following equation is obtained using the equation (4):

$$d\Theta=(dL/L_2)\cos \Phi/(1+\sin \Phi) \tag{5}$$

Here, when "$ddL=0$" is defined by differentiating the equation (5), the following equation (6) is obtained when $\Phi$ is constant:

$$dd\Theta=-(dL_2/L_2)d\Theta \tag{6}$$

Figure 5:
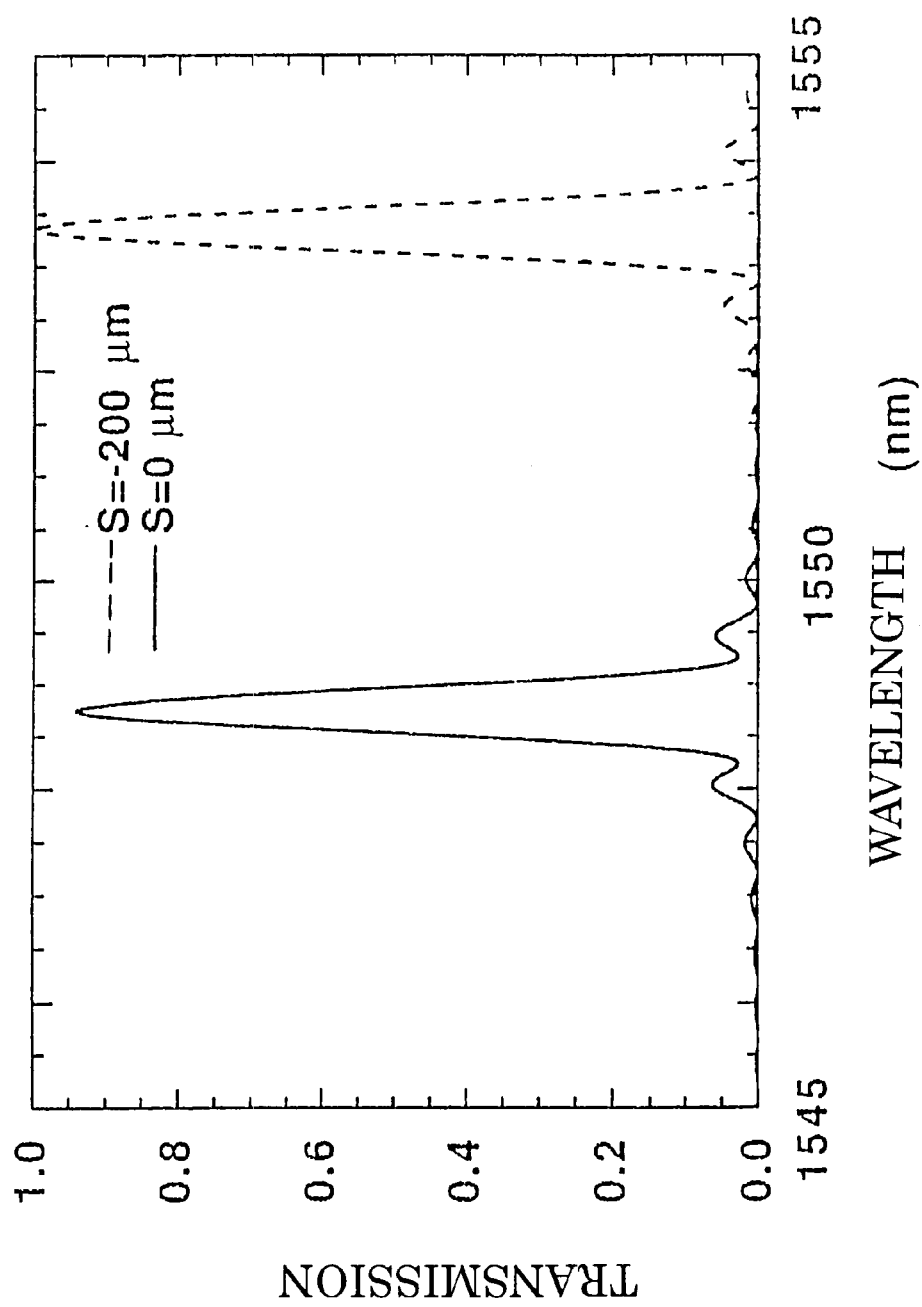
FIG. 5 is a simulation result for output intensity of the light wave division device of the preferred embodiment of the present invention.

Then, $L_2 d\Theta$ turns to be constant by solving the equation (6). This means that the light waveguide is part of an ellipse curve. The result of a simulation corresponding to the input wavelength of the output intensity is shown in FIG. 5. The scale of the property change is small even if the output position 28 is changed. Each of the two curves having peak points indicate each wavelength property at each of the points that are an average central position, S=0, of the output position 28 and a position being 200 μm away therefrom. The two curves are nearly identical.

Here, the number of reflecting surfaces (the number of the discontinuous parts 25 is 16), the distance between the reflecting surfaces (the length of the optical waveguide 24), the distance between average central positions of the input wavelength and the focal point 28, and the starting position of the reflecting surface are defined as 32, 100 μm, 3 mm, and 9.5 mm respectively. As indicated in the equations, ddΘ/dΘ<<1, and the result of the simulation, the uniformity on the output ports for the loss and the property of a side lobe (peak stroke) found in the wavelength property has been maintained.

Furthermore, when Φ is defined as a variable in the equation (6), $$dd\Theta = d\Theta[(-dL_2/L_2)-(\tan \Phi-\cos \Phi/(1+\sin \Phi))d\Phi] \quad (7)$$

thus $$d\Phi = (-dL_2/L_2)/[\tan \Phi-\cos \Phi/(1+\sin \Phi)] \quad (8)$$

and $$dd\Theta = 0 \quad (9).$$

The uniformity is thus furthermore improved. According to the present invention, the reflecting surface can be formed while a waveguide forming process is performed, and mass production becomes possible. Compared with the arc shape, the structure thereof is close to a straight line structure. Accordingly, the occupied area thereof can be made smaller, manufacturing is made easier, and the picking number thereof can be increased. Furthermore, the property change between the output ports is small.

Figure 6:
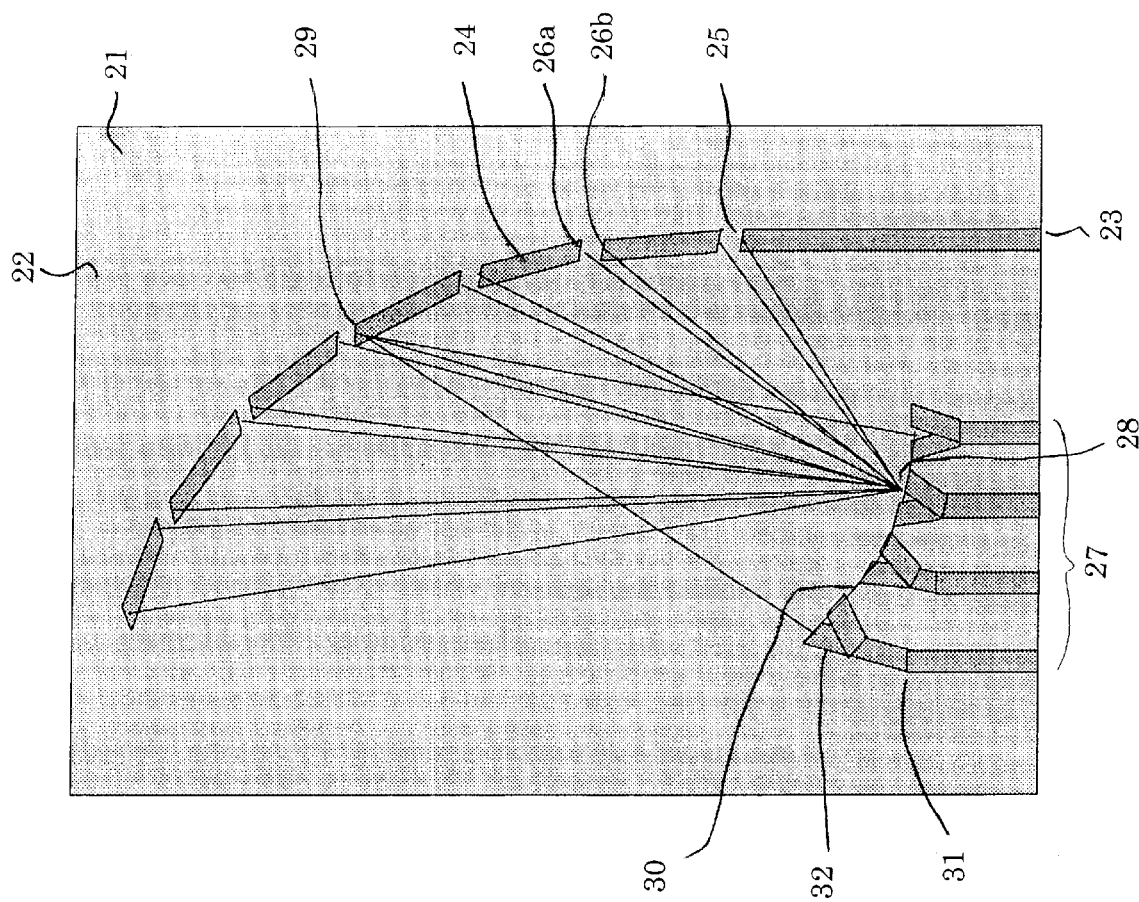
FIG. 6 is a top plane view of a light wave division device of a second preferred embodiment of the present invention.

FIG. 6 shows an optical wave division device that explains the second preferred embodiment. Firstly, an opening 32 of the output waveguide 27 is formed on an arc of the circle that has a center 29 of a reflecting region. Thus, the output waveguide 27 includes the curved structure 31. Th is bending of the curve is small. Furthermore, the structure of the opening 32 is formed to have a distribution of the light field having two peaks. A Y branch, a multi-mode waveguide or the like may be used for the opening 32.

The wave characteristic, which is flat in the transparent range, can be obtained this way. Furthermore, it is possible to suppress the change of the output power even if the wavelength of the light source shifts. Furthermore, it is possible to make it uniform to change the property of the wavelength corresponding to a position change S by forming the opening 32 on the arc of the circle.

In the above-mentioned explanation, the operation of the wave division device has been explained. Here, a multiplexing wave device can be obtained if each order of the waveguides of the input and output is reversed.

As explained above, it is possible to produce a multiplexing wave division device which is manufactured by an easy production process and has better controllability and the structure of the reflecting surface has a suitable waveguide shape.

What is claimed is:

1. A light multiplexing wave division device, comprising:
   a planar waveguide;
   a first curved waveguide formed in said planar waveguide, wherein said first curved waveguide comprises a discontinuous portion by being partially separated by said planar waveguide so as to be discontinuous; and
   a plurality of second waveguides;
   wherein a light signal input to said first curved waveguide is reflected by said discontinuous portion and wave-divided and input to one of said second waveguides, and a light signal being input to the one of said second waveguides is input by said discontinuous portion and wave-multiplexed to said first curved waveguide.

2. The light multiplexing wave division device of claim 1, wherein said first curved waveguide is in the shape of a circle.

3. The light multiplexing wave division device of claim 1, wherein said first curved waveguide is in the shape of an ellipse.

4. The light multiplexing wave division device of claim 1, wherein said second waveguides are in the form of a branch.

5. The light multiplexing wave division device of claim 1, wherein said first curved waveguide has a shape determined by an equation:

$$d\Phi = (-dL_2/L_2)/[\tan \Phi-\cos \Phi/(1+\sin \Phi)],$$

wherein Φ is the slope of a section length of said first curved waveguide to a first line, the first line extends between a reflective surface at one end of the section length and a second line, the first line is perpendicular to the second line, the second line extends from a reflective surface at a second end of the section length to the one of said second waveguides, $L_2$ is a length of a third line from the one end of the section length to the one of said second waveguides, and $dL_2$ is a length from the second end of the section length to a point of intersection between the first line and the second line.

6. A light multiplexing wave division device, comprising:
   a planar waveguide;
   a first curved waveguide formed in said planar waveguide and having a higher effective refractive index than said planar waveguide, wherein said first curved waveguide comprises a discontinuous portion by being partially separated by said planar waveguide so as to be discontinuous; and
   a plurality of second waveguides;
   wherein a light signal input to said first curved waveguide is reflected by said discontinuous portion and wave-divided and input to one of said second waveguides, and a light signal being input to the one of said second waveguides is input by said discontinuous portion and wave-multiplexed to said first curved waveguide.

7. The light multiplexing wave division device of claim 6, wherein said first curved waveguide is in the shape of a circle.

8. The light multiplexing wave division device of claim 6, wherein said first curved waveguide is in the shape of an ellipse.

9. The light multiplexing wave division device of claim 6, wherein said second waveguides are in the form of a branch.

10. The light multiplexing wave division device of claim 6, wherein said first curved waveguide has a shape determined by an equation:

$$d\Phi = (-dL_2/L_2)/[\tan \Phi-\cos \Phi/(1+\sin \Phi)],$$

wherein Φ is the slope of a section length of said first curved waveguide to a first line, the first line extends between a reflective surface at one end of the section length and a second line, the first line is perpendicular to the second line, the second line extends from a reflective surface at a second end of the section length to the one of said second waveguides, $L_2$ is a length of a third line from the one end of the section length to the one of said second waveguides, and $dL_2$ is a length from the second end of the section length to a point of intersection between the first line and the second line.

11. The light multiplexing wave division device of claim 6, wherein said first curved waveguide has an input port formed in said planar waveguide, said input port having a higher effective refractive index than said planar waveguide.

* * * * *